United States Patent

[11] 3,530,801

[72] Inventor George S. Murillo
 Monrovia, California
[21] Appl. No. 433,884
[22] Filed Feb. 19, 1965
[45] Patented Sept. 29, 1970
[73] Assignee Chem-Therm Mfg. Co. Inc.
 Monrovia, California
 a corporation of California

[54] TRANSPORTING DEVICE AND METHOD
 15 Claims, 10 Drawing Figs.
[52] U.S. Cl. .................................................. 104/172
[51] Int. Cl. .................................................. B61j 3/04
[50] Field of Search ..................................... 104/172;
 134/123; 198/170—1

[56] References Cited
UNITED STATES PATENTS

| | | | |
|---|---|---|---|
| 798,450 | 8/1905 | Roberts............. | 104/172 |
| 844,164 | 2/1907 | Miller............... | 104/172 |
| 2,936,770 | 5/1960 | Emanuel........... | 134/123 |
| 3,058,433 | 10/1962 | Hurst................ | 104/172 |
| 3,064,587 | 11/1962 | O'Neal.............. | 104/172 |
| 3,196,806 | 7/1965 | Brunder............ | 104/172 |

Primary Examiner—Drayton E. Hoffman
Attorney—Edgar Wallace Breisch

ABSTRACT: An automobile tow conveyor having an endless flexible chain with portions driven in a horizontal plane with a plurality of elongated yokes spaced along and affixed to a preselected pintle shaft of such chain and with freely rotatable rollers mounted on such yokes, and an elongated guide member for receiving and guiding the yokes and chain through the conveying portion of the conveyor.

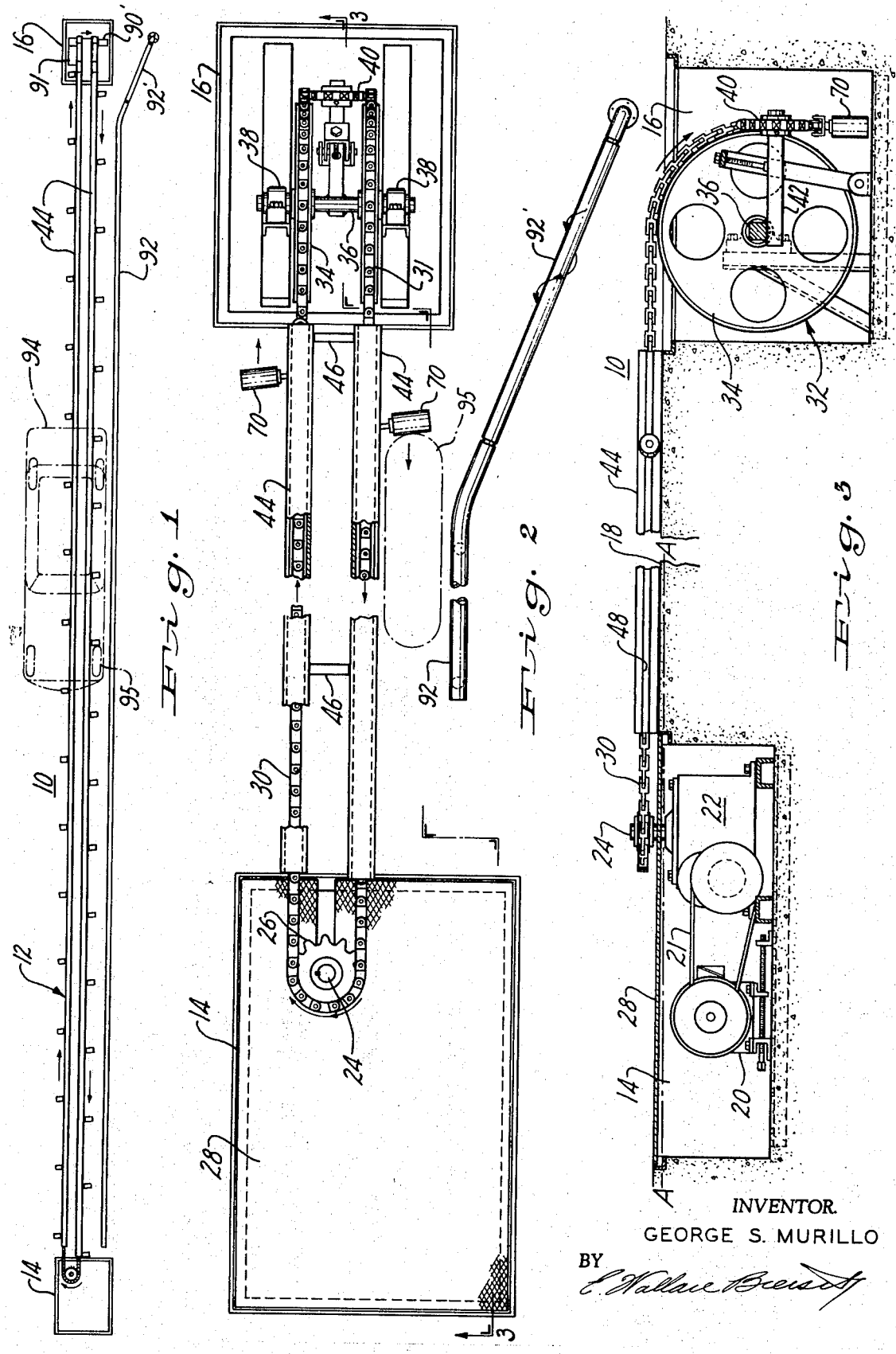

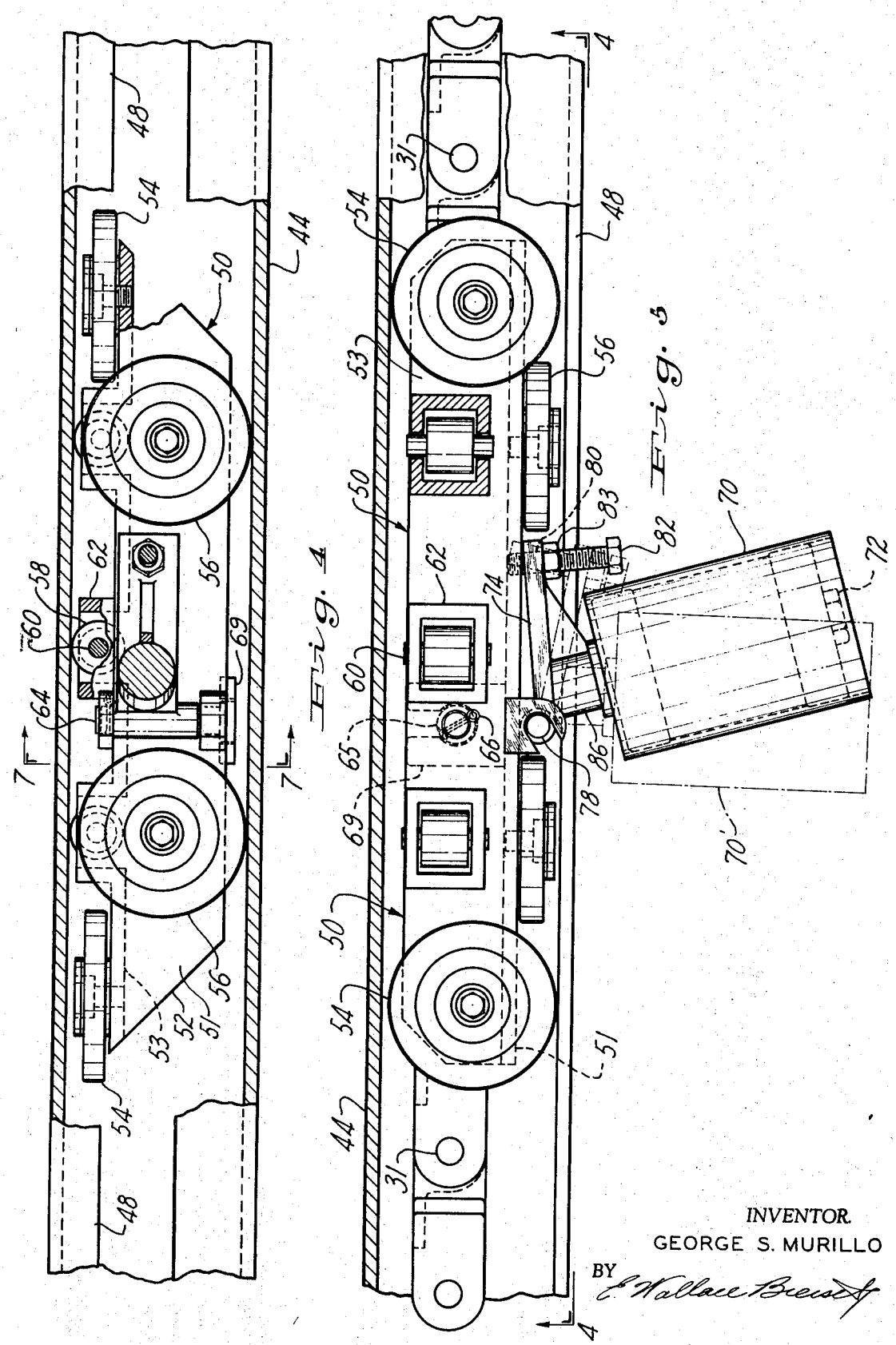

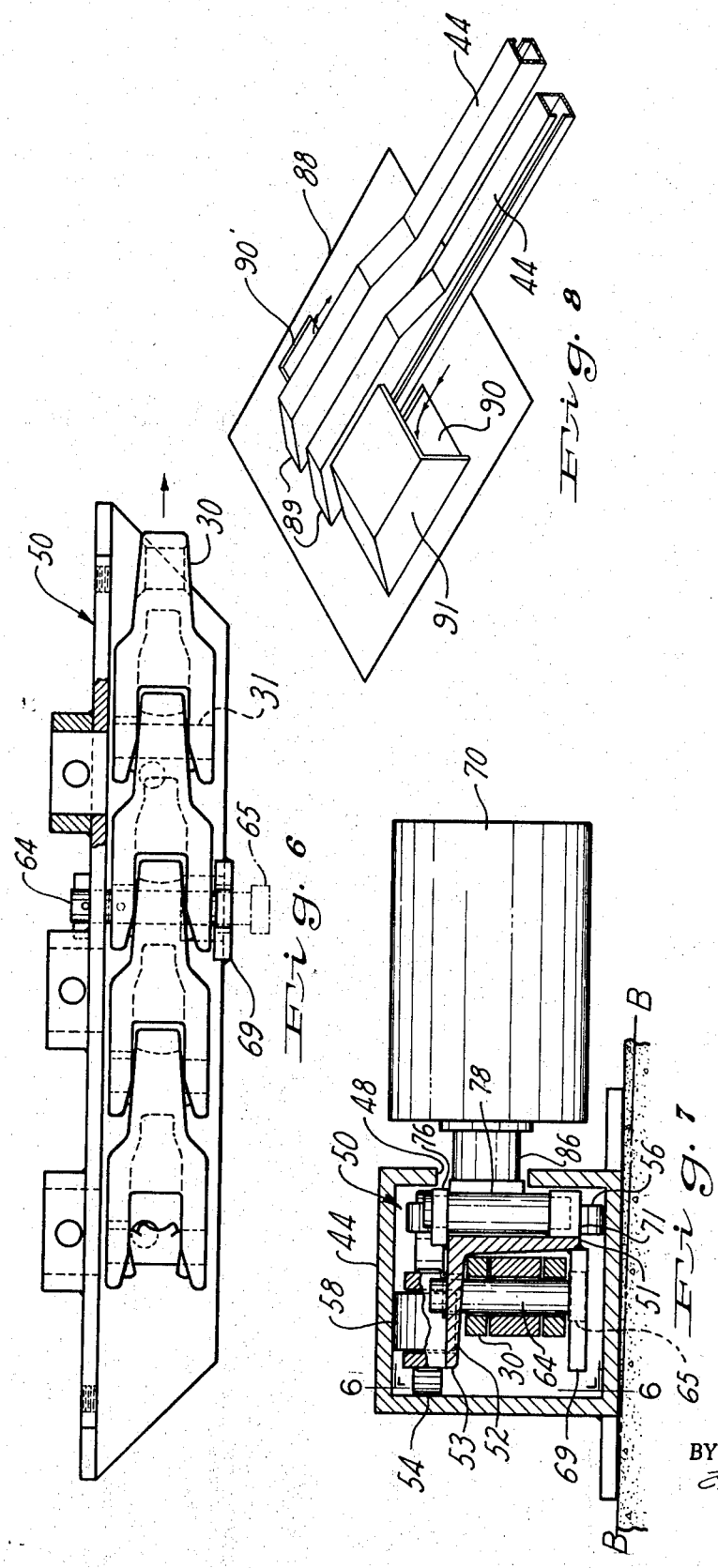

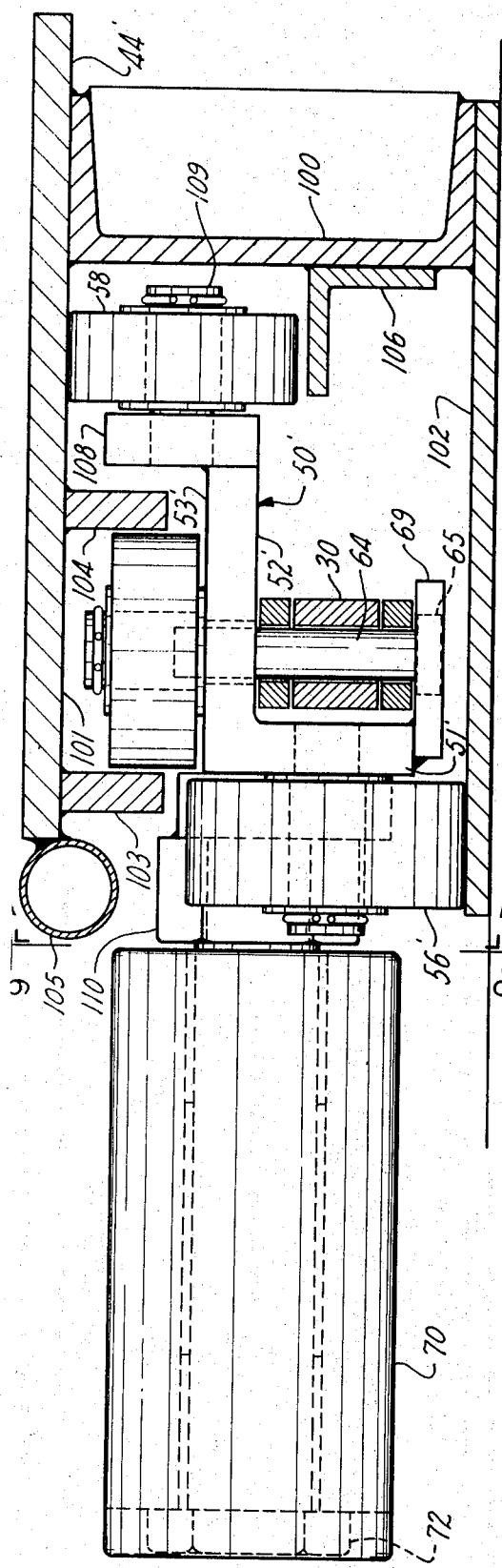
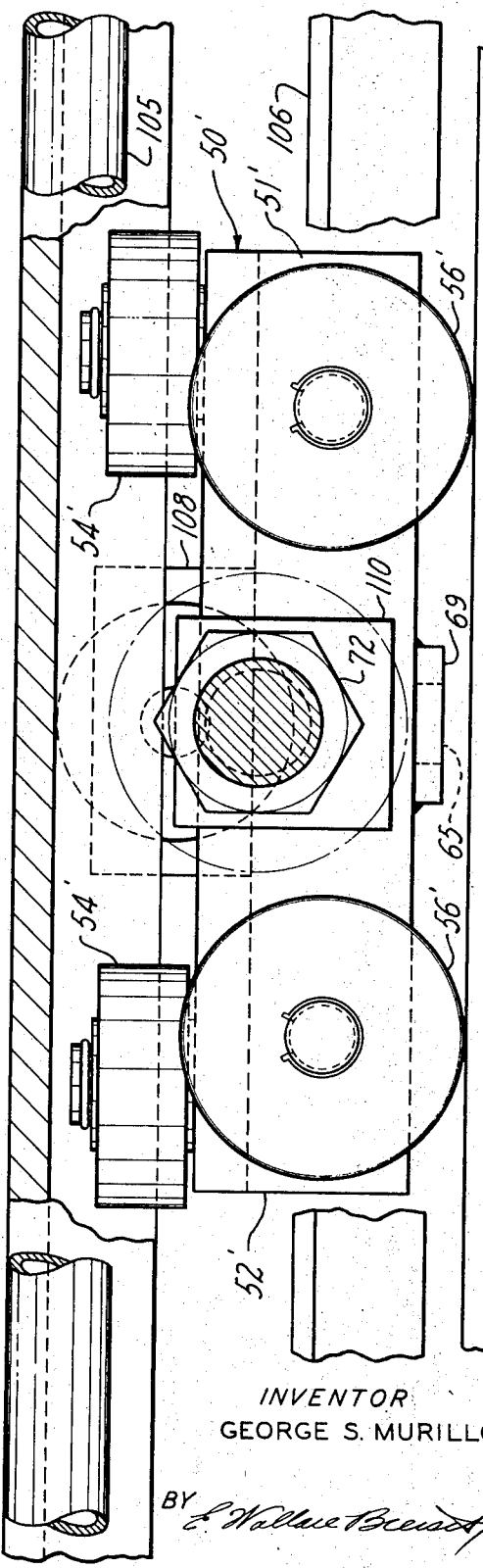

3,530,801

TRANSPORTING DEVICE AND METHOD

Endless chain conveyors adapted to push an automobile along a predetermined path are useful in various situations, but, since the present invention was primarily developed for, though not limited to, the propelling of automotive vehicles through an automatic car wash, this invention will be described in relation to such use.

Devices for pushing a car along a predetermined path are well known in the field of automobile servicing and have served the purpose through the application of force to some part of the automobile and the provision of guide rails to force the automobile to follow the predetermined path. However, as long as the pushing and guiding functions were separate functions it was necessary to provide guide rails on both the left and right hand sides of the wheels on one side of the car with the disadvantage of poor accommodation to different size tires and dirtying up of the white sidewalls on the outside surface of the tire or alternatively to guide the automobile with guide rails positioned to contact the inside surface of both a left hand and a right hand wheel making it necessary for the guide rails to be spaced according to the transverse spacing of the wheels of the automobile which in the present state of automotive manufacturing would demand a variety of rails spaced at various distances from each other.

The conveyor of the present invention eliminates the need for a second guide rail, except as a safety feature, and greatly reduces pressure against the one guide rail that is being used by combining the pushing and steering functions in an angularly adjustable pushing element which is adjustable at the time of installation of the conveyor to provide both motive force and guidance for an automobile along a predetermined path in conjunction with the use of a single rail adjacent the inside surface of the tire but not primarily necessary as a guide member since the tire touches it very lightly if at all when the pushing element is properly angularly adjusted in relation to the built-in slope of the car wash floor where the device of this invention has been installed.

It is therefore an object of this invention to provide a new and improved vehicle conveyor.

It is a further object of this invention to provide a new and improved vehicle conveyor in which pushing and guiding functions are accomplished by a single element.

It is a more specific object of this invention to provide a new and improved vehicle conveyor having a pusher element propelled in a predetermined path by an endless chain, which pusher element is angularly adjustable relative to such path to provide guidance to an automobile wheel so that the automobile follows a predetermined path while being propelled forwardly at a predetermined rate.

It is a further specific object of this invention to provide a new and improved conveyor for moving a wheeled vehicle along a substantially horizontal surface wherein a pair of spaced apart rotatable members having a chain trained thereabout orbit the chain and attached pusher elements in an orbit having a bight portion and elongated parallel portions above and parallel to such surface and having another bight portion below such surface.

These and other objects and advantages of this invention will become more apparent upon reading the description in conjunction with the following drawings in which:

FIG. 1 is an over-all top plan view of a vehicle conveyor constructed according to the principles of this invention;

FIG. 2 is a fragmentary top plan view on an enlarged scale of right and left end portions of the device of FIG. 1;

FIG. 3 is a sectional view taken substantially on line 3–3 of FIG. 2;

FIG. 4 is a sectional view taken substantially on line 4–4 of FIG. 5;

FIG. 5 is a partially sectional top plan view of a portion of the vehicle conveyor of FIG. 1;

FIG. 6 is a sectional view taken along line 6–6 of FIG. 7;

FIG. 7 is a sectional view taken substantially on line 7–7 of FIG. 4;

FIG. 8 is a three dimensional perspective view of a cover member applicable to portions of FIGS. 2 and 3, but omitted therefrom for purposes of clarity;

FIG. 9 is a fragmentary partially sectional view of a second embodiment of the vehicle conveyor of this invention taken substantially on line 9–9 of FIG. 10;

FIG. 10 is a transverse partially sectional view of the second embodiment of this invention.

In FIG. 1 there is shown a vehicle conveyor 10 constructed according to the principles of this invention and provided with an orbitally driven motive means generally indicated at 12 having a drive box 14 at its left hand end and a takeup box 16 at its right hand end as shown in FIG. 1 with the motive means 12 extending therebetween. The vehicle conveyor 10 is installed upon a substantially flat floor 18 which, however, slopes slightly downwardly from left to right as viewed in FIG. 3 and shown by comparison with the line A–A which is parallel to ground level in the vicinity of the installation. The floor 18 slopes downwardly from right to left as viewed in FIG. 7 and shown by comparison with a line B–B of FIG. 7 which is also parallel to ground level in the vicinity of the installation. The slope of the floor 18 from left to right as seen in FIG. 3 is substantially constant throughout the length of the installation while the slope shown in FIG. 7 is true for only one-half of the floor while the other half of the floor slopes upwardly from the center in a direction away from the left hand end of FIG. 7 all of which sloping is necessary to assure water drainage in the proper direction from the sides of the installation to the center and from the finishing end of the car wash installation shown to the left in FIG. 1 toward the entrance end of the car wash installation shown to the right of FIG. 1. The above mentioned floor halves can be given slopes which differ from each other for a purpose to be described.

The drive box 14 is a generally rectangular pit (see FIG. 3) sunk below the surface of the floor 18 to provide room for the installation of a suitable drive motor 20 suitably connected to a device providing electric current and suitably controlled in the usual manner for starting and stopping and speed adjustment. The drive motor 20 is connected as by a belt 21 to a suitable speed reduction mechanism 22 rigidly secured in the drive box 14 and supporting and providing power to a rotatably journaled upwardly extending sprocket shaft 24 on which is mounted a direction change means such as a sprocket 26 for powered rotation, in keyed relationship with shaft 24 (see FIG. 2). The drive box 14 is covered by a suitable flat plate 28 of suitable stiffness to bear the weight of a car passing thereover and set flush with the floor 18 and normally forming a smooth continuation thereof.

A suitable conveyor chain 30, of a type well known in the art having flexibility with a minimum radius of 3 inches or less in one direction and a moderate amount of flexibility with a minimum radius of 12 or 13 inches in a direction at right angles to the first mentioned flexibility, has a bight portion reversedly trained about the sprocket 26 and elongated parallel portions extending longitudinally of the conveyor 10 to and into the take-up box 16. Similarly to the drive box 14 the take-up box 16 is a pit generally rectangular in form sunk below the surface of floor 18 sufficiently for the installation of a return idler and direction change take-up mechanism generally indicated at 32 which comprises a pair of idler wheels 34 spaced apart and pivotally mounted to rotate about a common horizontal axis transverse to the direction of chain travel and at a height to support the chain 30 parallel to the floor surface 18. The wheels 34 rotate about longitudinally spaced portions of an elongated shaft 36 which is in turn pivotally mounted in the take-up box 16 in any suitable manner as by spaced bearings 38 pivotally supporting end portions of the shaft 36. A direction reversing means such as idler sprocket 40 is pivotally mounted on a sprocket shaft 42 rigidly secured normal to the shaft 36 at its central portion. The chain 30 is reversedly trained about the idler sprocket 40 which is suitably positioned outwardly adjacent the periphery of the wheels 34 so that the chain traveling in orbital fashion circulates about the drive sprocket 26 above the drive box 14, through an elongated tube 44 of rectangular cross section resting on the floor surface 18 and extending from the drive box 14 to the take-up box 16 wherein the chain 30 emerging from the tube 44 contacts the periphery of one of the wheels 34 for approximately 90° of its circumference. The chain 30 then forms a bight portion and travels about approximately 180° of the idler sprocket 40 to a point of contact on the periphery of the other wheel 34 which in turn supports the chain 30 for approximately 90° of its circumference. The chain 30 then enters a second elongated tube 44 resting on the surface 18 and similarly extending between the take-up box 16 and the drive box 14 to support and guide the chain 30 as it returns to the sprocket 26 to complete one cycle of orbital motion. The tubes 44 lie in laterally spaced parallel relationship on the floor surface 18 and are rigidly secured at their ends to the drive box 14 and the take-up box 16 and maintained in spaced parallel relationship by a plurality of cross braces 46 extending between the tubes 44. Each tube 44 has a longitudinal notch 48 (see FIG. 3) extending the full length of the side most remote from the other tube 44 for a purpose to be made clear.

The tubes 44 besides guiding and protecting the chain 30 also provide a guide and track surface for a plurality of multiple roller dollies, generally indicated at 50 (see FIG. 3—7) connected to the chain 30 and traveling therewith in the orbital path hereinabove described. Each dolly 50 comprises an elongated frame member 52 of inverted L-shaped cross section having a vertical leg member 51 and a horizontal leg member 53 as best seen in FIG. 7. Each dolly 50 is provided with at least a pair of horizontal wheels 54 and a pair of vertical wheels 56 to contact the interior of the tubing 44 to support and guide the frame member 52 as it is moved along the tube 44 by action of the chain 30. Each dolly 50 is also provided with a plurality (shown as 3) of rollers 58 pivotally mounted to rotate about fixed, transversely spaced, horizontal axes and so placed as to bear against the top inside surface of the tube 44 for a purpose to be explained hereinafter. The rollers 58 are provided with suitable axles 60 suitably journaled in upwardly extending hollow rectangular portions 62 of the frame member 52. The links of the chain 30 are pivotally secured together by link pins 31 except where the chain 30 passes through an intermediate portion of the dolly 50 where one link pin 31 is replaced by an elongated cylindrical dolly pin 64 having a radially enlarged cylindrical head 65 at its bottom end and extending upwardly through the chain 30 and horizontal leg 53 of the frame 52 is provided with retaining means such as a cotter pin 66 or the like to prevent the pin 64 from dropping down out of engagement with the frame 52. The head 65 is axially slidably received within the round end portion of an open ended keyhole shaped slot 68 (see FIG. 5) formed in a horizontally disposed flat plate lug member 69 (see FIG. 7) secured to the bottom edge of an intermediate portion of the vertical leg member 51. The narrow straight portion of the keyhole shaped slot 68 is of a suitable width to slidably receive the main body portion of the pin 64 so that when the dolly 50 is outside the tubes 44, as it would be when near to or passing around the sprocket 26, the cotter pin 66 can be removed and the pin 64 dropped down until the head 65 is disengaged from the keyhole slot 68 and the upper end of the pin 64 is disengaged from the horizontal leg 53. The dolly 50 can then be removed from the chain 30 without disengaging any of the links of the chain so that the dolly 50 can be readily serviced, adjusted and replaced without disconnecting the chain 30 at any point.

The purpose of the dollies 50 is to support, guide and propel, along the orbital path above described, a rotatably mounted cylindrical pusher means such as a roller 70 mounted on each dolly 50 to rotate about a horizontal axis substantially normal to the dolly 50 at an intermediate portion thereof. The roller 70 is suitably journaled on an elongated cylindrical pin 72 which is rigidly secured to a bracket member 74 which is rigidly adjustably mounted outwardly adjacent the side of the vertical leg member 51 on an intermediate portion thereof. In a preferred embodiment of the dolly 50 a pair of vertically spaced horizontally extending lug members 76 and 77 upper and lower members respectively, have aligned open ended slots in which is removably, pivotably secured an elongated cylindrical pin 78 having a central body portion of a diameter larger than the width of the slots and reduced diameter end portions slidably receivable in the slots so that the pin 78 cannot move axially in the slots but can be removed by transverse movement of the pin 78. The bracket member 74 is rigidly secured to the body portion of the pin 78 at one end of the bracket member 74 while at the other end of the bracket 74 a threaded bore 80 having an elongated threaded retaining member such as a cap screw 82 therein threadedly engaged with the bracket member 74 and the vertical leg 51 and being locked in place by a threaded member such as a lock nut 83 serves to hold the bracket member 74 rigidly in place but to allow for angular adjustment of the bracket member 74 about the axis of the pin 78. This adjustment allows the axis of the roller 70 to be adjusted from a position approximately 15° to the right of a transverse line normal to the dolly 50 as shown in FIG. 5 to a position such as that shown in dotted and dashed outline identified as 70' which position is normal to, or slightly to the left of the transverse line normal to, the dolly 50. The push roller 70 is rotatably mounted on a shaft 86 rigidly secured to and outwardly extending from the bracket member 74. The shaft 86 is of a suitable diameter so that it can extend through the slot 48 with a reasonable amount of clearance so that as the dolly 50 travels through the tubes 44 the shaft 86 travels along the slot 48 without interference.

A suitable take up box cover 88 illustrated in FIG. 8 has rectangular, tubular, elongated portions 89 mating with the ends of the tubes 44 to support and guide the dolly 50 as it travels over a portion of the take-up box 16 and is also provided with suitable openings such as opening 90 through which the push roller 70 travels downwardly through the cover into the box 16, and an opening 90' through which roller 70 passes upwardly out of the take-up box 16. The opening 90 is also provided with an upwardly spaced, formed cover member 91 so that as much as possible of the take-up box 16 is covered to prevent water and dirt from falling therein.

As best seen in FIG. 1, the conveyor 10 is also provided with an elongated generally cylindrical rail member 92 parallel to and laterally spaced from the tubes 44 and having an outwardly angled end portion 92' to provide initial guidance at the entry end (seen to the right in FIG. 1) for a vehicle such as an automobile 94 as shown in dotted and dashed outline in FIG. 1. The left front wheel 95 of the automobile 94 is shown in dotted and dashed outline in FIG. 2.

To operate the conveyor 10 of this invention, the motor 20 is suitably energized so that through the speed reduction mechanism 22 and the shaft 24 the sprocket 26 is rotated in a clockwise direction as viewed in FIGS. 1 and 2. The chain 30 is then caused to orbit as hereinabove described carrying with it the dollies 50 so that the push rollers 70 travel along a path parallel to and outwardly adjacent the tubes 44 with the rollers 70 nearest the guide rail 92 traveling from right to left as viewed in FIGS. 1 and 2. While the conveyor 10 is thus operating the automobile 94 is driven onto the left hand end of the conveyor being first guided somewhat to the left of the desirable position shown in FIG. 2 until it strikes the guide portion 92' which guides the left front wheel 95 toward the left hand tube 44 until it is either touching the left hand tube 44 or very closely adjacent thereto as shown in FIG. 2. One of the rollers 70 having arisen from the take-up box 16 through the slot 90' contacts the wheel 95 in its lower rearward tread portion and begins to push the vehicle 94 along the slightly rising floor surface 18 with the automobile transmission in neutral and the engine shut off. Since the roller 70 contacts the wheel 95 at a point very near the floor 18 a large portion of the pushing force is directed upwardly with the result that a component of the reactive force acts downwardly on the roller 70. This downward reactive force is accommodated by the three rollers 58 which bear against the upper inside surface of the tube 44.

The hereinbefore described sloping of the floor surface 18 from the left to the center of the conveyor 10 is most likely counterbalanced by equal transverse sloping of the other half of the floor 18 unless differing slopes are used to aid in guiding the vehicle 94. However, with a forward push on the left front wheel of the automobile 94 there is some tendency for the car to steer toward the right hand side which would make it gradually approach and finally contact the outer surface of the tube 44 nearest the guide rail 92. Proper positioning of the roller 70, that is adjustment of the angle between the axis of the roller 70 and the longitudinal centerline of the chain orbit, will cause the roller 70 to apply the proper amount of bias to the back side of the left front wheel 95 so that the wheel 95 proceeds from right to left as seen in FIG. 2 without touching either the tube 44 or the guide rail 92. Since correct angular positioning of the roller 70 is determined by the physical characteristics of the floor 18, experimentation at the time of installing the conveyor 10 will establish the correct angle necessary for steering the cars in the desired path. After such angle has been determined, all of the rollers 70 can be positioned at the desired angle by adjustment of the cap screw 82 (see FIG. 4) which is then locked by tightening the lock nut 83. Thereafter one car after another can be positioned as above described and being both propelled and steered by roller 70 such cars will travel along the desired path with no more than a minimum of guidance contact from either the tube 44 or the rail 95.

Advantages inherent in the above described construction of the conveyor 10 are as follows: the chain 10 travels throughout its orbit in a well protected position so that it is not subjected to water and dirt and therefore has a long wearing life; the chain 10 trained about the drive sprocket 26 and the idler sprocket 40 and suspended between successive dollies 50 does not rub against the inside of the tubes 44 as is common in most prior art conveyors giving a further increase in wearing life; the take-up box 16 provides a protected area for take-up and direction reversal at the end of the conveyor where mispositioning of the automobiles is most likely to cause damage to the chain and the take-up mechanism; the adjustable rollers 10 do not only provide motive force for the automobile to move it along the gently rising floor 18, but also provide guidance for the left front wheel so that less power is needed to propel the automobile through the conveyor than would be the case were the wheel 95 forced to rub along either the guide rail 92 or the tube 44 with attendant friction loss requiring greater motive power; another advantage from the steering of the wheel 95 rather than from guide rail action resides in the avoidance of smearing the white walls after they have been washed which is a common occurrence with rail type guidance; another advantage inherent in this type of guidance resides in confining the guidance to the left hand wheel of a car so that variations in track width between cars of various models and sizes do not call for a variation in the conveyor 10 as is necessary where both left and right hand wheels of the car are being guided as in some prior art devices.

FIGS. 9 and 10 illustrate a second embodiment of the vehicle conveyor of this invention wherein parts of identical design and function with those of FIGS. 1—8 are identified by the same reference numeral in both embodiments and elements of similar design and function to those above described for FIGS. 1—8 are identified by the same reference numeral primed throughout FIGS. 9 and 10. The elongated tubes 44 of the earlier embodiment are, in the embodiment of FIGS. 9 and 10, each replaced by an elongated, hollow, guide rail 44' of generally rectangular cross section made up of an elongated portion of standard channel iron 100 and a pair of vertically spaced generally parallel, elongated metallic plate members 101 and 102, upper and lower plate members respectively rigidly secured to opposite leg members of the channel member 100. Rigidly secured to the under side of the upper plate member 101 inwardly adjacent the edge of the plate member 101 most remote from the channel member 100 is an elongated guide element 103 of generally rectangular cross section laterally spaced from and parallel to a similar guide element 104 rigidly secured to an intermediate portion of the under side of the upper plate member 101. Outwardly adjacent and rigidly secured to the edge of the upper plate member 101 most remote from the channel member 100 is an elongated hollow metal tube 105 extending the full length of the channel 44' to provide an inner guide rail for the wheel 95 whenever it becomes necessary to prevent the automobile 94 from veering to the right as it progresses through the vehicle conveyor. Downwardly spaced from the upper plate 101 and rigidly secured to the inwardly facing surface of the channel element 100 is an elongated angle element 106 extending full length of the channel member 100 for a purpose to be described.

A second form of the dolly 50 generally indicated at 50' comprises an elongated generally rectangular portion of angle iron identified as a frame member 52' having a vertical leg member 51' and a horizontal leg member 53' forming the body portion of the dolly 50'. A pair of vertical wheels 56' rollingly supported by the lower plate member 102 are rotatably mounted on laterally spaced, parallel, horizontal shaft elements rigidly secured to the vertical leg member 51' for the purpose of supporting the dolly 50' as it travels along the guide 44'. A pair of horizontally disposed wheels 54' are rotatably mounted on laterally spaced vertical shafts rigidly secured to the horizontal leg member 53' within the channel formed between the guide elements 103 and 104 to prevent transverse motion of the dolly 50' as it travels along the guide 44'. Rigidly secured to and upwardly extending from the edge of the horizontal leg member 53' nearest the channel member 100 is a generally rectangular roller mounting bracket 108 to which is rigidly secured a suitable horizontal shaft 109 upon which there is in turn pivotably secured a roller 58' of a diameter suitable to fit between the under side of the upper plate 101 and the angle element 106 so that the roller 58' in conjunction with the vertical wheels 56' holds the dolly 50' in the desired horizontal attitude. The lug member 69 having a keyhole slot as earlier described receives the dolly pin 64 and removably secures the dolly 50' to the chain 30 in the same manner as that described for the embodiment of FIGS. 1—8. A two piece bracket member 110 rigidly secured to the vertical leg 51' provides for mounting the roller pin 72 removably secured in the mounting bracket 110 as by threaded engagement in a threaded bore (not shown) in the mounting bracket 110. The push roller 70 is rotatably secured on the roller pin 72 to complete the dolly 50' of the embodiment of FIGS. 9 and 10.

The operation of the dolly 50' is the same as that described for the dolly 50 excepting only that no direct provision is made for adjusting the angular position of the roller 70 except by reworking of the bracket 110. All of the other advantages hereinbefore recited as resident in the vehicle conveyor 10 of applicant's invention except those dependent upon variation in the guidance feature will be found to be resident in a conveyor using the dolly 50' as well as the one using the dolly 50. An added advantage found in the use of the dolly 50' resides in the generally simpler construction and more rugged design of the dolly 50' as compared to the dolly 50, part of which ruggedness of design is achieved through the use of the improved guide element 44' having a much wider cross section so that the transverse distance between the vertical wheels 56' and the vertical roller 58' is much greater in the dolly 50' than in the dolly 50. As a result the downward reaction of the wheel 95 against the roller 70 is more readily supported and damage to the dolly 50' is held to a minimum even when, as sometimes happens, an automobile is driven over one or more of the rollers.

Preferred embodiments of this invention having been herein described and illustrated, it is to be realized that other embodiments of this invention are possible and envisioned. It is therefore respectfully requested that the claims of this application be interpreted as broadly as possible and be limited only by the prior art.

I claim:
1. A conveyor for moving a wheeled vehicle along a substantially horizontal surface comprising: first flexible member reversing means rotatable about a substantially vertical axis; second flexible member reversing means spaced from said first reversing means with at least one portion thereof rotatable about a substantially horizontal axis, said second reversing means having the major portion thereof located below such surface; an elongated endless flexible member trained about all of said reversing means; drive means drivingly connected to one of said reversing means to orbit said flexible means in an elongated orbit comprising a bight portion and elongated parallel portions upwardly adjacent such surface and a portion located below such surface; a plurality of carriage means attached to said flexible means and orbitable therewith; and pusher means attached to and movable with said carriage means, respectively, for contacting a wheel of a vehicle to be moved along a path adjacent to one of said parallel portions.

2. A conveyor as specified in claim 1 wherein: said pusher means is angularly adjustable in a generally horizontal plane relative to said parallel portions to guide such vehicle along a predetermined path.

3. A conveyor as specified in claim 1 wherein said flexible member has discrete members flexibly secured together by pin elements in aligned bores and wherein said carriage means are secured to pairs of said discrete members by pins slideably received in aligned bores of said aligned bores respectively.

4. A conveyor as defined in claim 1 having an elongated stationary member for receiving and guiding said carriage means through said one parallel portion.

5. A conveyor as defined in claim 4 in which each of said carriage means sequentially engages said elongated member to transmit load forces experienced by said pusher means during movement through said one parallel portion directly to said elongated member.

6. A conveyor as defined in claim 1 wherein each of said pusher means includes an elongated shaft connected at one end only to said carriage means associated therewith for pivotable movement about a pivot axis which axis is substantially vertical during movement of said pusher means through said elongated portions of said orbit, and means carried by each of said pusher means engagable with said carriage means associated therewith for selectively positioning said pusher means about said pivot axis with respect to said carriage means associated therewith.

7 A conveyor as specified in claim 6 wherein said flexible means has discrete members flexibly secured together by pin elements in aligned bores and wherein said carriage means are secured to pairs of said discrete member by pins slideably received in aligned bores of said aligned bores respectively.

8. In an automobile tow conveyor, the combination comprising: an endless pintle chain having portions driven in a horizontal plane on at least one pair of sprocket gears spaced a substantial distance apart; a plurality of elongate yokes spaced along said pintle chain, each yoke being affixed to a preselected pintle shaft in said pintle chain; a tire-engaging roller mounted on each of said yokes for free rotation about a horizontal axis and extending outwardly from said yoke; and an elongate guide member for receiving and guiding said yokes and said pintle chain through the conveying portion of the pintle chain circuit.

9. An automobile tow conveyor as set forth in claim 8 wherein said elongate yokes are engageable with said guide member to transmit load forces experienced by the rollers associated therewith directly to said guide member.

10. An automobile tow conveyor comprising: an endless pintle chain having portions driven in a horizontal plane on at least one pair of sprocket gears spaced a substantial distance apart; a plurality of elongate yokes spaced along said pintle chain, each yoke being affixed to a preselected pintle shaft in said pintle chain; a tire engaging roller mounted on each of said yokes for free rotation about a horizontal axis and extending outwardly from said yoke; an elongate guide member for receiving and guiding said yokes and said pintle chain through the conveying portion of the pintle chain circuit; and a guide rail having a portion in spaced, parallel relationship with said guide member for cooperating with said guide member to define a channel for guiding the tires on one side of the automobile being conveyed.

11 In an automobile tow conveyor, the combination comprising: an endless chain having a plurality of pintle shafts and driven in an elongate circuit, at least the major portions of the conveying and return legs of said elongate circuit being in a common horizontal plane; a plurality of roller shafts; a plurality of tire-engaging rollers, each mounted on one of said roller shafts for free rotation about said roller shaft; means associated with each of said roller shafts for connecting said roller shaft to a preselected one of said plurality of pintle shafts such that said roller shaft extends outwardly with respect to said chain in a plane perpendicular to said preselected pintle shaft; and a stationary guide member for guiding said means through the conveying leg of said elongate circuit, said means being adapted to transmit load forces experienced by its associated tire-engaging roller directly to said guide member.

12. A conveyor apparatus for propelling an automobile having at least one tire adapted to be moved through an automobile treatment facility along a predetermined path, said conveyor apparatus comprising: endless flexible driving means located for travel partially along said predetermined path; means for maintaining said endless driving means in a driving position along said predetermined path; means for engaging said automobile tire; means connecting said tire-engaging means to said endless driving means so as to maintain said tire-engaging means at a desired angle to the direction of travel of said endless driving means; and rigid elongated guide means located along said predetermined path for accommodating and guiding said connecting means, said connecting means including a portion overlapping and wider than said flexible driving means, said portion being adapted to be transversely embraced by said guide means such that load force moments exerted by said tire-engaging means are borne by said guide means and not by said flexible driving means when said connecting means is being accommodated and guided by said guide means.

13. In an automobile tow conveyor, the combination comprising: an endless chain having a plurality of pintle shafts and driven in an elongate circuit on at least one pair of sprocket gears, at least the major portions of the conveying and return legs of said elongate circuit being in a common horizontal plane; a plurality of elongate members, each rigidly affixed to a preselected one of said pintle shafts; a plurality of roller shafts each rigidly affixed at one end to one of said elongate members so as to extend outwardly therefrom in a plane perpendicular to said preselected pintle shaft; a plurality of tire-engaging rollers each mounted on one of said roller shafts for free rotation about said roller shaft; and stationary, elongate guide means for guiding said elongate members through said conveying leg of said elongate circuit.

14. In an automobile conveyor, the combination comprising: an endless chain driven in an elongate circuit and having a plurality of pintle portions associated with respective links in said chain, at least the major portions of the conveying and return legs of said elongate circuit being in a common horizontal plane; a plurality of roller shafts; a plurality of tire-engaging rollers, each mounted on one of said roller shafts for free rotation about said roller shaft; means associated with each of said roller shafts for rigidly connecting said roller shaft to a preselected one of said links of said chain such that said roller shaft extends outwardly with respect to said chain in a direction perpendicular to the direction of longitudinal orientation of said link and such that said roller shaft is adapted to travel in said common horizontal plane; and a stationary guide member for guiding said means through the conveying leg of said elongate circuit, said means including a portion overlying and wider than said chain, said portion being transversely embraced by said guide member such that load force moments exerted by said roller shafts are borne by said guide member and not by said chain when said means is being guided through the conveying leg of said elongate circuit.

15. In an automobile tow conveyor, the combination comprising an endless pintle chain having portions driven in a horizontal plane on at least one pair of sprocket gears spaced a substantial distance apart; a plurality of elongate yokes spaced along said pintle chain, each yoke being affixed to a preselected pintle shaft in said pintle chain; a tire-engaging roller mounted on each of said yokes for free rotation about a horizontal axis and extending outwardly from said yoke, and an elongate guide member for receiving and guiding said yokes and said pintle chain through the conveying portion of the pintle chain circuit, said guide member having a generally rectangular cross-sectional configuration with a longitudinal slot in its outer side wall extending the length of said guide member to accommodate travel of said shafts.